(12) United States Patent
Mohammed

(10) Patent No.: US 7,604,476 B2
(45) Date of Patent: Oct. 20, 2009

(54) HOT RUNNER NOZZLE SYSTEM

(75) Inventor: Sohail Mohammed, Colchester, VT (US)

(73) Assignee: Husky Injection Molding Systems Ltd. (CA)

( * ) Notice: Subject to any disclaimer, the term of this patent is extended or adjusted under 35 U.S.C. 154(b) by 240 days.

(21) Appl. No.: 11/923,103

(22) Filed: Oct. 24, 2007

(65) Prior Publication Data

US 2009/0110765 A1    Apr. 30, 2009

(51) Int. Cl.
B29C 45/20    (2006.01)
(52) U.S. Cl. .................................. 425/549; 264/328.15
(58) Field of Classification Search .................. 425/549, 425/564, 566; 264/328.15
See application file for complete search history.

(56) References Cited

U.S. PATENT DOCUMENTS

| | | | |
|---|---|---|---|
| 4,309,379 A | 1/1982 | Dannels et al. | |
| 4,434,053 A | 2/1984 | Osuna-Diaz | |
| 4,450,999 A | 5/1984 | Gellert | |
| 5,098,280 A | 3/1992 | Trakas | |
| 5,206,040 A | 4/1993 | Gellert | |
| 5,284,436 A | 2/1994 | Gellert | |
| 5,318,434 A | 6/1994 | Gellert | |
| 5,405,258 A | 4/1995 | Babin | |
| 5,569,475 A * | 10/1996 | Adas et al. | 425/549 |
| 5,783,234 A * | 7/1998 | Teng | 425/549 |
| 5,871,786 A * | 2/1999 | Hume et al. | 425/549 |
| 2004/0224046 A1* | 11/2004 | Babin | 425/564 |
| 2004/0258788 A1 | 12/2004 | Olaru | |
| 2004/0258795 A1 | 12/2004 | Guenther et al. | |
| 2005/0087481 A1 | 4/2005 | Boast et al. | |
| 2005/0142247 A1 | 6/2005 | Babin et al. | |
| 2006/0083813 A1 | 4/2006 | Fairy | |
| 2006/0188416 A1 | 8/2006 | Alward et al. | |
| 2006/0263462 A1 | 11/2006 | Manda | |

FOREIGN PATENT DOCUMENTS

WO    9106413 A1    5/2001

OTHER PUBLICATIONS

Machine needle shut-off nozzle type HP pneumatically or hydraulically controlled. Manual (online), Xaloy, 2005, Retrieved on Sep. 30, 2008. Retreived from the internet http://www.herzog-ag.com/Pdfs/Technical_English/Xaloy/HP_English_from-2005.pdf.
Search Report 4 pages.

* cited by examiner

*Primary Examiner*—Tim Heitbrink

(57) ABSTRACT

Disclosed is a hot-runner nozzle system, including: (i) a nozzle housing being configured to convey a molten molding material, (ii) a sieve being coupled with the nozzle housing, (iii) a nozzle tip being securely coupled relative to the sieve, and (iv) a retainer securely extending from the sieve, the retainer connecting with the nozzle tip.

24 Claims, 6 Drawing Sheets

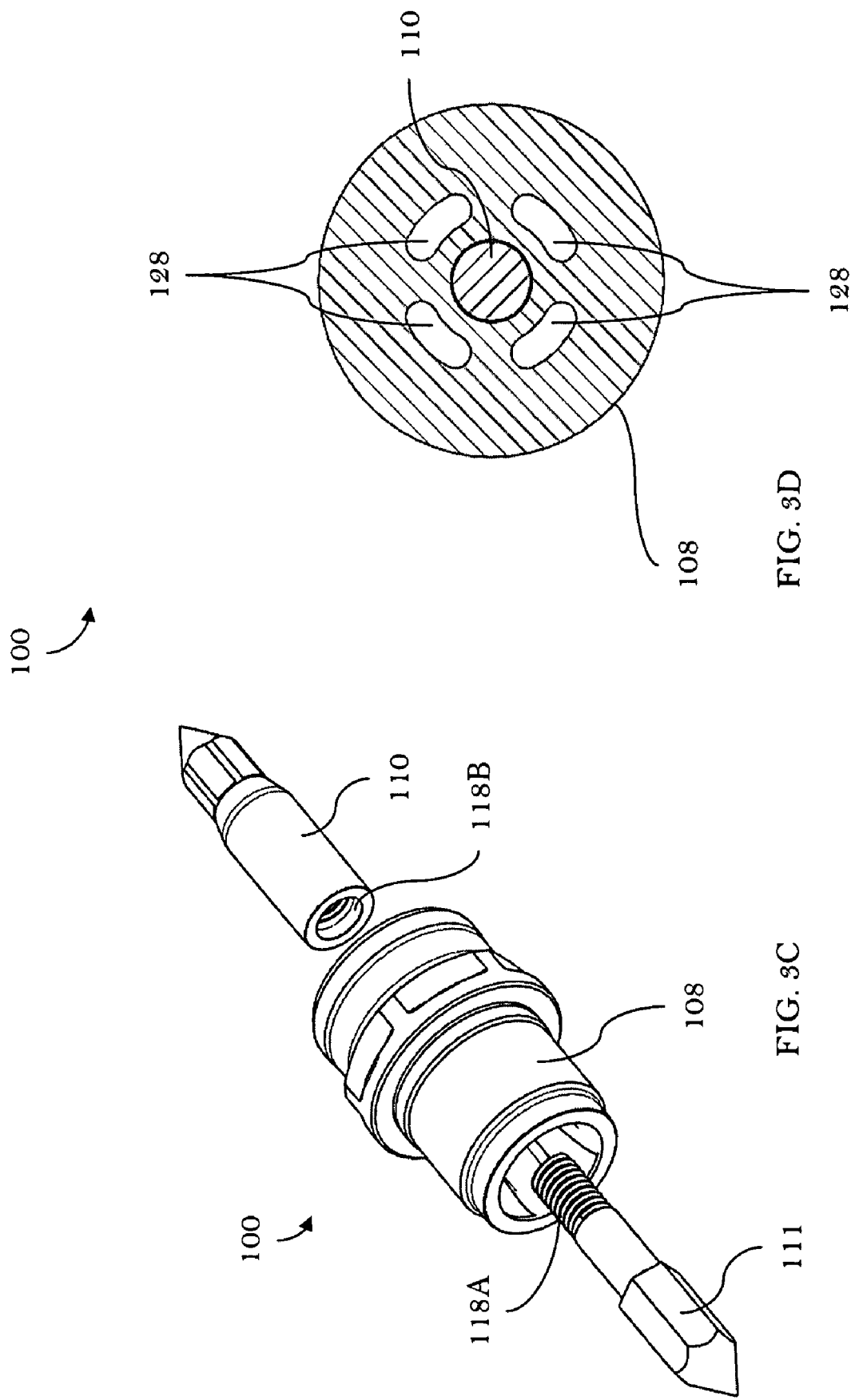

HOT RUNNER NOZZLE SYSTEM

TECHNICAL FIELD

The present invention generally relates to, but is not limited to, hot-runner systems and more specifically the present invention relates to, but is not limited to, (i) hot-runner nozzle systems.

BACKGROUND

Examples of known molding systems are (amongst others): (i) the HyPET (trademark) Molding System, (ii) the Quadloc (Trademark) Molding System, (iii) the Hylectric (trademark) Molding System, and (iv) the HyMET (trademark) Molding System, all manufactured by Husky Injection Molding Systems (Location: Canada; www.husky.ca).

FIG. 1A depicts a known hot-runner nozzle system associated with U.S. Pat. No. 4,450,999 (Inventor: GELLERT; Published: May 29, 1984) which discloses: (i) a hot tip nozzle seal for use in a sprue gated injection molding system, and (ii) a method of manufacture. The nozzle seal has a cylindrical outer portion, an elongated central pin portion and a number of ribs extending therebetween to define a number of apertures through the nozzle seal. The outer portion is seated in both the heated nozzle and the cavity plate to bridge the insulative air gap between them. The central pin portion of the seal has a tip portion which extends downstream into the gate and a head portion which extends upstream into the nozzle bore. The central pin portion has an inner conductive portion formed of copper and an outer protective casing formed of steel. The seal is designed so that the head portion picks up a predetermined amount of heat from the surrounding melt and transfers it through the highly conductive copper to the tip portion which extends to where it is required, without being unacceptably susceptible to abrasion or corrosion from difficult materials such as glass filled flame retardant nylon. The seal is made by integrally filling the steel pin casing with copper in a vacuum furnace. The filled casing is then brazed into a body portion with the ribs and a cap brazed on in the vacuum furnace to provide the integral abrasion and corrosion resistant nozzle seal.

FIG. 1B depicts a known hot-runner nozzle system associated with U.S. Pat. No. 5,098,280 (Inventor: TRAKAS; Published: Mar. 24, 1992), which discloses a gating needle for use in an injection molding sprue bushing that has an elongated central needle portion and at least three radially extending members which extend radially outwardly from the central needle portion. The gating needle is seated in an annular cavity or circular recess disposed at the outlet end of a sprue bushing and is capable of slight axial movement due to the action of the injected melt flowing around it so that the needle maintains a constant position and clearance within the mold cavity gate. The gating needle may include an interior heat transfer portion in the form of either a highly thermally conductive metal core portion or in the form of a sealed hollow tube containing a vaporizable liquid. The interior heat transfer portion transfers heat from the surrounding melt to the mold cavity gate to maintain the mold cavity gate area at a constant temperature.

FIG. 1C depicts a known hot-runner nozzle system associated with U.S. Pat. No. 5,206,040 (Inventor: GELLERT; Published: Apr. 27, 1993), which discloses a hot tip gated injection molding apparatus having a heated manifold to distribute melt to a number of spaced gates. An unheated sealing and conductive member is mounted directly between the heated manifold and the cooled cavity plate in alignment with each gate. The sealing and conductive member has an elongated hot tip shaft which is connected to extend centrally through the bore of an outer collar portion by a number of spaced spiral blades. The collar portion bridges an insulative air space between the hot manifold and cooled cavity plate to prevent melt leaking into it. Heat received through the rear end of the collar portion which abuts directly against the heated manifold is transferred through the blades and the hot tip shaft to the gate area which is aligned with the pointed forward end of the hot tip shaft. The rear end of the hot tip shaft extends rearwardly into a branch of the melt passage to pick up heat from the surrounding melt. The hot tip shaft has a highly conductive inner portion inside an abrasion resistant outer portion to conduct heat to and away from the gate area during different parts of the injection cycle. The spiral blades impart a swirling motion to the melt which flows between them.

FIG. 1D depicts a known hot-runner nozzle system associated with U.S. Pat. No. 5,284,436 (Inventor: GELLERT; Published: Feb. 8, 1994), which discloses an injection molding apparatus wherein a torpedo is mounted in the front end of a heated nozzle. The torpedo has spaced blades extending inwardly from an outer collar to an elongated shaft which extends centrally in the melt bore. The torpedo shaft has an elongated central portion which is securely press fitted in a steel outer sleeve from which the blades extend. The elongated central portion of the torpedo shaft extends forwardly into the gate, and is formed of an engineered ceramic such as silicon carbide which is very thermally conductive as well as abrasion and corrosion resistant. In one embodiment, the gate extends through a gate insert which is also formed of a thermally conductive and abrasion and corrosion resistant engineered ceramic material.

FIG. 1E depicts a known hot-runner nozzle system associated with U.S. Pat. No. 5,318,434 (Inventor: GELLERT; Published: Jun. 7, 1994), which discloses an injection molding apparatus wherein a torpedo is mounted at the front end of a nozzle to provide a fixed ring gate. The torpedo has an elongated central shaft with a nose portion which projects forwardly into a cylindrical opening extending through the mold to the cavity. The outer surface of the nose portion is sufficiently spaced from the inner surface of the opening to form the ring gate through which the melt flows into the cavity. The nose portion of the central shaft enhances heat transfer during the injection cycle and thus reduces cycle time and provides cleaner gates.

FIG. 1F depicts a known hot-runner nozzle system associated with U.S. Pat. No. 5,405,258 (Inventor: BABIN; Published: Apr. 11, 1995), which discloses an injection molding apparatus for hot tip gating wherein a torpedo is screwed into a threaded seat in the forward end of a nozzle. The torpedo has an elongated shaft with a pointed tip mounted centrally in an outer collar by a pair of spiral blades which impart a swirling motion to the melt flowing to the gate. The temperature of the melt in the gate varies according to a continuous thermodynamic cycle in the torpedo. A thermocouple bore extends radially inward through the outer collar and one of the spiral blades to a conductive inner portion of the central shaft of the torpedo. The thermocouple bore is positioned whereby a thermocouple element extends radially outward from it into an insulative air space between the forward end of the nozzle and the mold. The thermocouple element has a substantially 90 degree rearward bend a predetermined distance from its inner end. The bend abuts against a tapered portion of the inner surface of the well in which the nozzle is seated to securely retain the thermocouple element against the inner end of the thermocouple bore. This accurate location and reliable retention of the thermocouple element in place provides the accurate monitoring of the melt temperature necessary for its control throughout the thermodynamic cycle.

FIG. 2A depicts a known screw-in nozzle tip. Based on high-pressure testing and high-temperature testing, the inventor found that the known screw-in nozzle tip systems may prematurely unscrew due to loss of preload at very high temperatures. The inventor's analysis also indicates that the nozzle tip may be inadequate for such extreme operating conditions.

FIG. 2B depicts a known nozzle tip, which are made with copper alloys that are held to the nozzle housing by their flange and using a steel retainer. The inventor's testing and analysis indicates that high pressures and temperatures may crack a tip flange during operation. The high-stress concentration resulting from an abrupt change in cross-section (that is, from the outer diameter of the nozzle tip to the outer diameter of the flange) may be undesirable for such operating conditions; as well, variation in thermal expansion amongst connected materials also inadvertently and disadvantageously raises stresses.

FIG. 2C depicts a known hot-runner nozzle system, in which a copper alloy tip lasts longer than other known nozzle systems at high pressures. The flange of the tip is tapered in this case to reduce the stress concentration. However, the inventor found that these tips also fail when the temperature was raised to 350° C.

SUMMARY

The patents identified above appear to disclose a torpedo-type nozzle tip where a molten molding material flows around a centrally-positioned cylindrical body towards a mold gate. Optimization of structural strength and thermal profile across such nozzle tips appears to require the use of multiple materials with varying material properties. The above-identified patents appear to disclose permanently joining a copper alloy with a steel body, in which portions of the nozzle tip (which is also called a nozzle-tip assembly) are difficult to replace for effective and easy serviceability. The aspects of the present invention enables, amongst other things, flexibility for replacing a portion or a component (i.e., a tip, a gate seal, etc.) of the nozzle-tip assembly as may be required, at a reasonable cost. Construction of hot runner nozzle tips with copper alloys may be a necessity for processing polycarbonate-type resins and nylon-type resins. However when these copper alloys are subject to temperatures in excess of roughly 320° C. (Centigrade), their strength appears to drastically drop, and the nozzle tips appear to fail to withstand high melt pressures typically beyond 35,000 psi (pounds per square inch).

The inventor has arrived at an understanding that conventional methods and arrangements associated with known hot-runner nozzle systems are inadequate for such aggressive operating conditions. Mold makers require even higher injection pressures to mold low-cost, thin-walled molded parts and articles. In response to these technical demands, the inventor believes that the non-limiting embodiments of the present invention provide a hot-runner nozzle that possesses a longer service life in view of known hot-runner nozzles. The non-limiting embodiments of the present invention provide a hot-runner nozzle system which may mitigate, at least in part, the above-mentioned problems.

According to a first aspect of the present invention, there is provided a hot-runner nozzle system, including: (i) a nozzle housing being configured to convey a molten molding material, (ii) a sieve being coupled with the nozzle housing, (iii) a nozzle tip being securely coupled relative to the sieve, and (iv) a retainer securely extending from the sieve, the retainer connecting with the nozzle tip.

A technical effect, amongst other technical effects, of the aspects of the present invention is improved replacement of a nozzle tip and improved heat distribution in the hot-runner nozzle system. Other effects are described below.

DETAILED DESCRIPTION OF THE DRAWINGS

A better understanding of the non-limiting embodiments of the present invention (including alternatives and/or variations thereof) may be obtained with reference to the detailed description of the non-limiting embodiments along with the following drawings, in which:

FIG. 3C depicts a partial perspective view of the system 100 according to a second non-limiting embodiment;

FIG. 3D depicts a top view of the system 100 according to a third non-limiting embodiment.

The drawings are not necessarily to scale and are sometimes illustrated by phantom lines, diagrammatic representations and fragmentary views. In certain instances, details that are not necessary for an understanding of the non-limiting embodiments or that render other details difficult to perceive may have been omitted.

DETAILED DESCRIPTION OF THE NON-LIMITING EMBODIMENTS

Figure 1A:
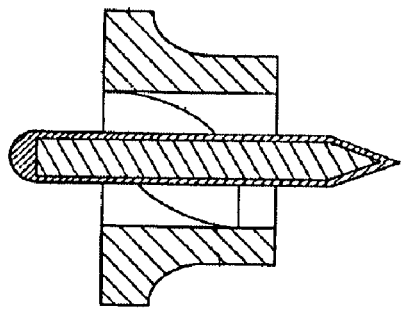
FIGS. 1A to 1F depict the known hot-runner nozzle systems.
Figure 1B:
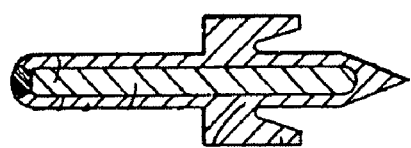
Figure 1C:
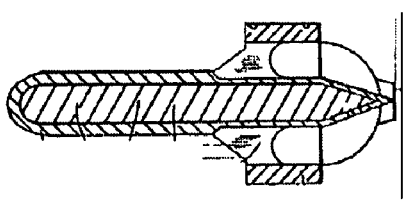
Figure 1D:
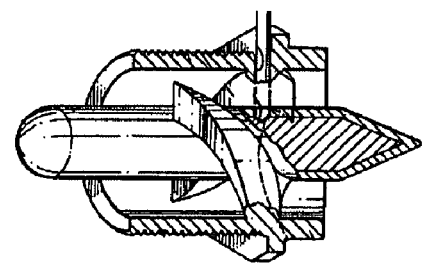
Figure 1E:
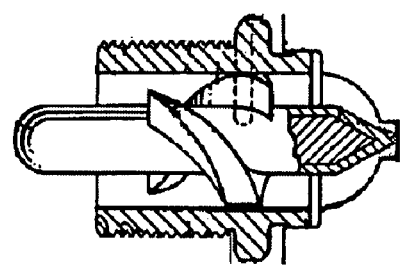
Figure 1F:
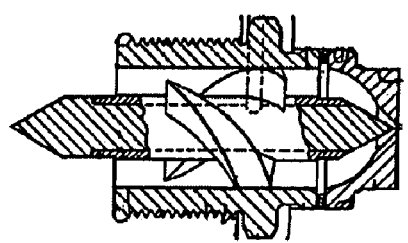
Figure 2C:
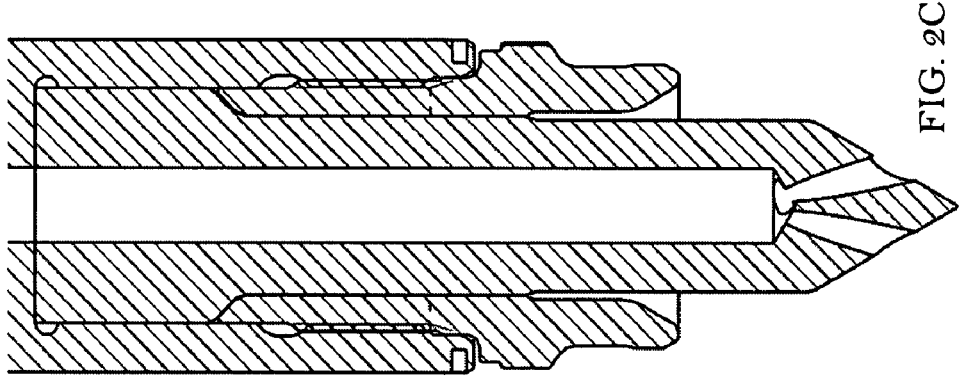
FIGS. 2A to 2C depict the known hot-runner nozzle systems.
Figure 2B:
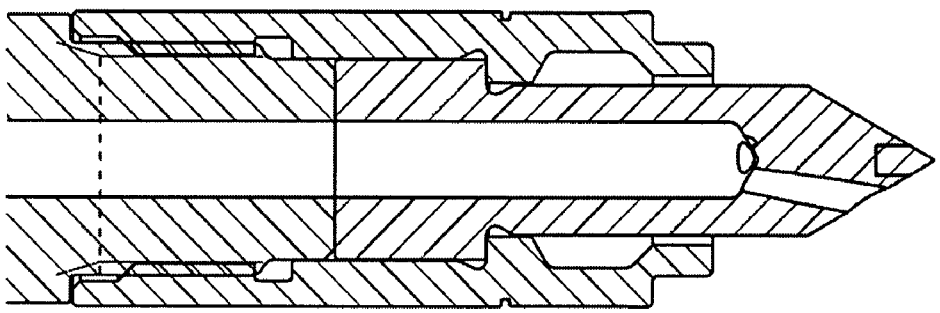
Figure 2A:
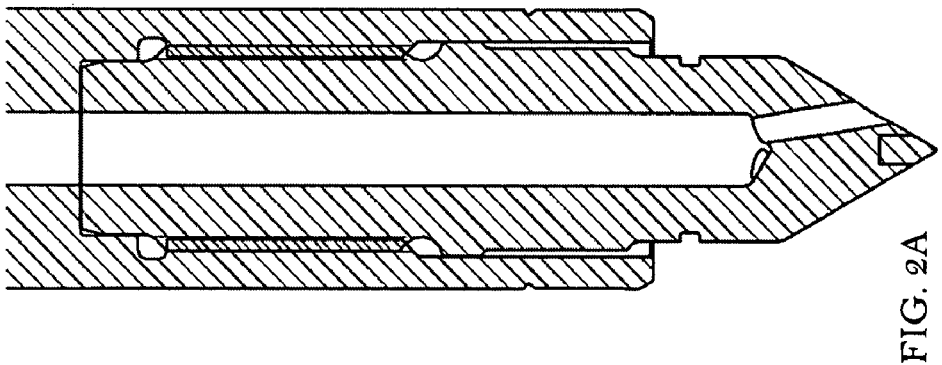
Figure 3A:
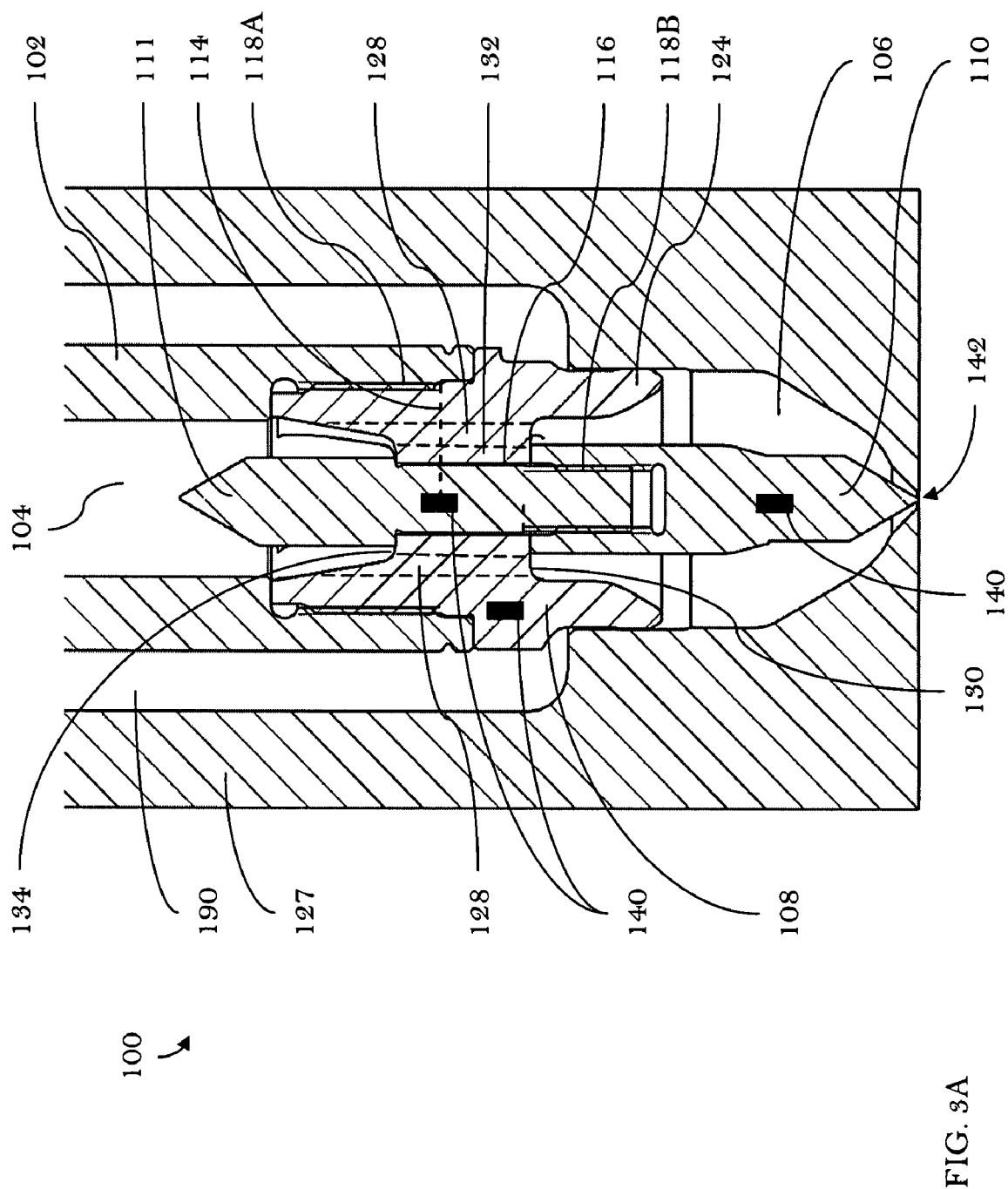
FIGS. 3A and 3B depict cross-sectional views of a hot-runner nozzle system 100 (hereafter referred to as the "system 100") according to a first non-limiting embodiment.
Figure 3B:
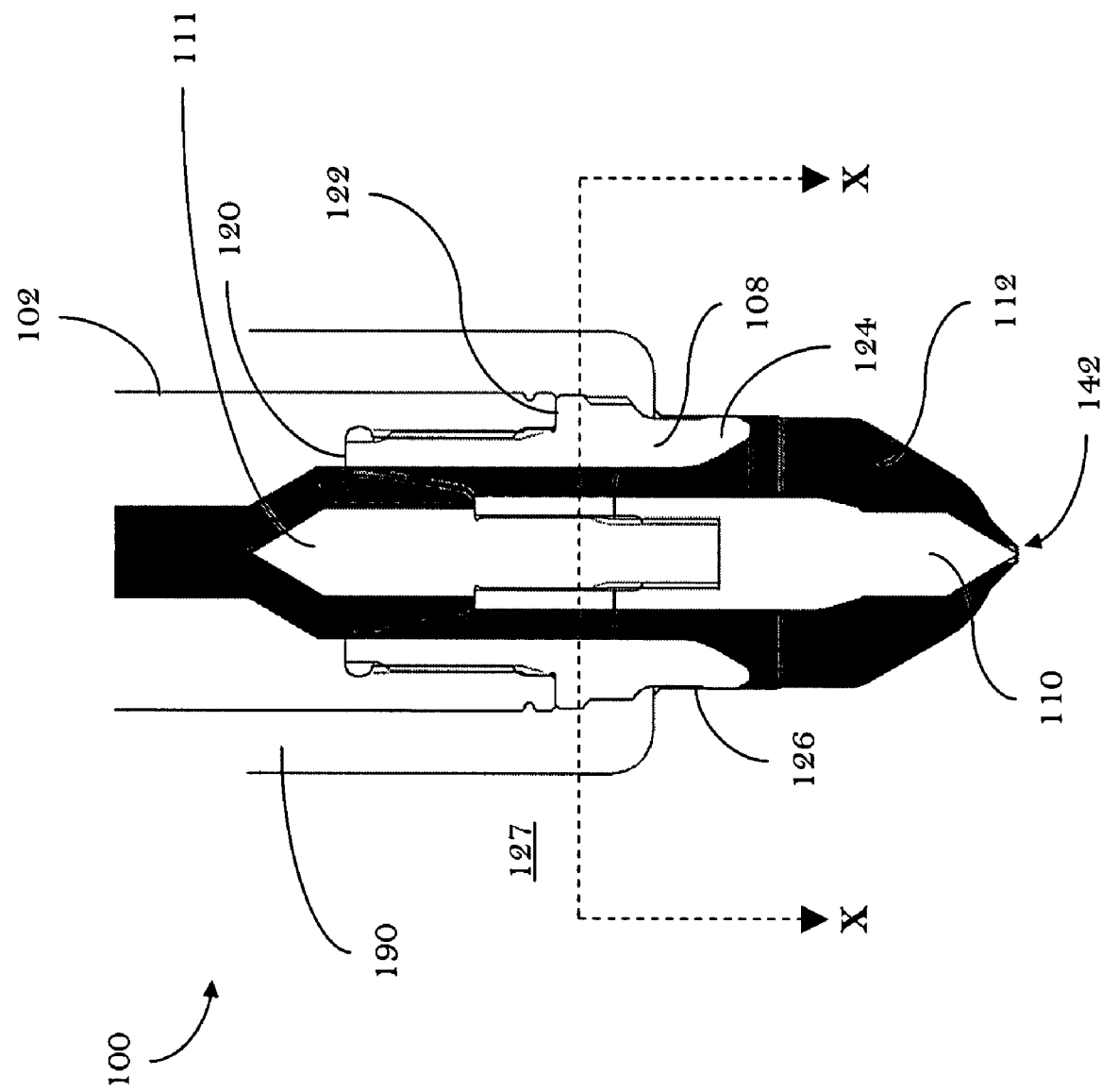

FIGS. 3A and 3B depict the cross-sectional views of the system 100 according to the first non-limiting embodiment. The system 100 is included in a hot runner (not depicted, but known) that is associated with an injection-molding system (not depicted, but known). The hot runner is used to distribute a molten molding material from an extruder (not depicted, but known) that is associated with the injection-molding system to a mold cavity defined by a mold (not depicted, but known). The hot runner includes a manifold (not depicted, but known) that has: (i) at least one input that is operatively coupled with the extruder so as to receive the molten molding material, (ii) at least one output that is coupled with the mold cavity so as to transmit the molten molding material to the mold cavity, and (iii) a melt passageway (or melt pathway) that leads from the input to the output. The system 100 is to be operatively placed in the melt passageway. It will be appreciated that the system 100, the mold, the hot runner and the injection-molding system may be sold together or sold separately.

According to the first non-limiting embodiment, the system 100 includes (in combination): (i) a nozzle housing 102, (ii) a sieve 108, (iii) a retainer 111, and (iv) a nozzle tip 110.

The nozzle housing 102 is made of a high-strength alloy. The nozzle housing 102 is operatively received in a bore that is defined by a mold insert 127. An insulation zone 190 is defined between the nozzle housing 102 and the mold insert 127. The insulation zone 190 is used to keep the nozzle housing 102 insulated from heat loss. The insulation zone 190 usually includes non-circulating air. The mold insert 127 is abutted against the mold. The mold insert 127 defines a mold gate 142 that leads to the mold cavity of the mold. The nozzle housing 102 has: (i) an entrance 104, and (ii) an exit 106. The entrance 104 is operatively connected with the melt passageway that is associated with the manifold of the hot runner. The exit 106 of the nozzle housing 102 is oriented to face the mold gate 142. The molten molding material may flow (under pressure) from the entrance 104 to the exit 106.

The sieve 108 is made of a high-strength alloy. Specifically, the sieve 108 is made with a material that has acceptable properties, such as: (i) low thermal conductivity, (ii) high wear resistance, (iii) high corrosion resistance, and (iv) high strength. The sieve 108 is received in a bore that is defined in the exit 106 of the nozzle housing 102, along the longitudinal axis that extends axially through the nozzle housing 102. The sieve 108 is coupled with the nozzle housing 102 (via threads 118A that are defined in the bore of the nozzle housing 102), so that the sieve 108 is threadably coupled with the nozzle housing 102. In this arrangement, a primary sealing interface 120 (depicted in FIG. 3B) and a secondary sealing interface 122 (depicted in FIG. 3B) is established between the sieve 108 and the exit 106 of the nozzle housing 102 once the sieve 108 is threadably attached with the nozzle housing 102. The sieve 108 includes a gate-contact portion 124 that is contactable against the mold insert 127, so that a gate-sealing surface 126 (depicted in FIG. 3B) is established between the gate-contact portion 124 and the side wall of the mold insert 127. The gate-contact portion 124 extends along an outer circumferential surface of the sieve 108. The sieve 108 includes a body that has: (i) a forward face 130 that faces the exit 106 of the nozzle housing 102, (ii) an aft face 134 that faces the entrance 104 of the nozzle housing 102, and (iii) a center portion 132 located between the forward face 130 and the aft face 134. The center portion 132 defines a passageway 116 that extends from the forward face 130 to the aft face 134. The passageway 116 is not used to convey the molten molding material (the purpose of the passageway 116 is explained in the next paragraph). The center portion 132 located along a central-axial axis that extends through the sieve 108 along the passageway 116. The forward face 130 is configured to seat the nozzle tip 110, so that the nozzle tip 110 may be mated to (or connected with) the forward face 130. The aft face 134 is configured to seat the retainer 111. The body of the sieve 108 defines a plurality of passages 128 that extend through the body from the forward face 130 and the aft face 134. The plurality of passages 128 is configured to convey (under pressure) the molten molding material through the body of the sieve 108. According to a non-limiting variant, the sieve 108 is configured to: (i) accommodate a device 140, and (ii) route a wire 114 to the device 140. The wire 114 is connected to the device 140. The device 140 is located in the sieve 108 proximate with the nozzle tip 110. The device 140 may include: a thermal sensor (such as a thermocouple), a heater, both the thermal sensor and the heater, a tip retaining element used to retain the nozzle tip 110. According to a non-limiting variant, the sieve 108 is configured to accommodate a valve stem (not depicted) that is movable relative to the sieve 108.

The retainer 111 is received, at least in part, in the passageway 116 that is defined by the sieve 108. The retainer 111 includes a shoulder that abuts against the aft face 134 of the sieve 108, so that the retainer 111 may be stopped from sliding all the way through the passageway 116 of the sieve 108. According to a non-limiting variant, the retainer 111 is configured to: (i) accommodate the device 140, and (ii) route the wire 114 to the device 140. The wire 114 is routed through the nozzle housing 102, through the sieve 108 and the retainer 111. The device 140 is located in the retainer 111 proximate with the nozzle tip 110. A thermocouple (that is located or accommodated in the retainer 111) may be accommodated proximate to the nozzle tip 110.

The nozzle tip 110 is securely joined with a retainer 111. The retainer 111 is configured to be received in a bore defined by the nozzle tip 110. The nozzle tip 110 operatively couples (or connects) with an end of the retainer 111 (via threads 118B that are located in the bore of the nozzle tip 110) so that the nozzle tip 110 is threadably coupled or threadably joined with the retainer 111. In this arrangement, the nozzle tip 110 is securely coupled relative to the sieve 108 by way of the retainer 111. The nozzle tip 110 is interactable (or faces) the mold gate 142. The retainer 111 securely extends through the sieve 108, and the nozzle tip 110 securely connects with the retainer 111, so that: (i) the retainer 111 abuts the sieve 108, and (ii) the nozzle tip 110 abuts the sieve 108. According to a non-limiting variant, nozzle tip 110 is configured to: (i) accommodate the device 140, and (ii) route the wire 114 to the device 140. The wire 114 is routed through the nozzle housing 102, through the sieve 108 and the retainer 111 to the nozzle tip 110. According to another non-limiting variant, the nozzle tip 110 is: (i) a low-cost replaceable item, (ii) pressure balanced, (iii) confined to low heat zone to improve life, (iv) configured to have reduced fatigue features, and (iv) highly heat conductive. "Pressure balanced" means that a majority of the high pressures act on opposing surfaces that act to cancel out resultant stresses. For high heat conductive applications, the nozzle tip 110 may include a copper alloy that is confined in a zone of the system 100 where temperatures do not exceed 320° C. (Centigrade). Preferably, the nozzle tip 110 includes a solid, non-hollow body made of a copper alloy. Generally, the nozzle tip 110 is made with a heat-conductive alloy (either being a non-copper based alloy or a copper-based alloy). The nozzle tip 110 may include an alloy that has moderate degree of thermal conductivity that is to be used where there is a lack of demand for high heat conduction.

Once assembled, installed, and in operation (as depicted in FIG. 3B), the nozzle housing 102, the sieve 108 and the nozzle tip 110 collectively define (at least in part, in association with the mold insert 127) a channel 112. The channel 112 is used for conveying the molten molding material from the manifold of the hot runner to the mold cavity after: (i) the nozzle housing 102 is connected with the manifold so that the nozzle housing 102 may receive the molten molding material, and (ii) the nozzle tip 110 is made to interact with the mold cavity so that the molten molding material may be conveyed, under pressure, to the mold cavity.

According to a non-limiting variant, the arrangement of the nozzle housing 102, the sieve 108, the nozzle tip 110 and the retainer 111 are in such a manner that any crack-susceptible, high-stress concentration features (such as, threads, flanges, abrupt change of cross-sections, etc.) that are made with a copper alloy are removed from the melt stream. According to another non-limiting variant, the arrangement of the nozzle housing 102, the sieve 108, the nozzle tip 110 and the retainer 111 allows exertion of hoop stress and fatigue stress only on the nozzle housing 102 and the sieve 108, which are both made of high strength alloys. According to yet another non-limiting variant, the nozzle housing 102, the sieve 108, the nozzle tip 110 and the retainer 111 are made of the same material for the case where: (i) serviceability and a high tip temperature is of less concern, and/or (ii) high pressure is an only requirement. According to yet another non-limiting variant, the sieve 108 and the retainer 111 are integrally designed to reduce parts count, provided pressure and temperature requirements are met, and in this case the nozzle tip 110 may be threadably attached to a threaded bore defined in the sieve 108.

FIG. 3C depicts the partial exploded perspective view of the system 100.

FIG. 3D depicts the top view of the system 100 (specifically, of the sieve 108) taken along a sectional line X-X (the sectional line X-X is depicted in FIG. 3B), in which the sieve 108 is donut shaped, but other shape variants are contemplated (such as a square-shaped circumference, etc).

Figure 3E:
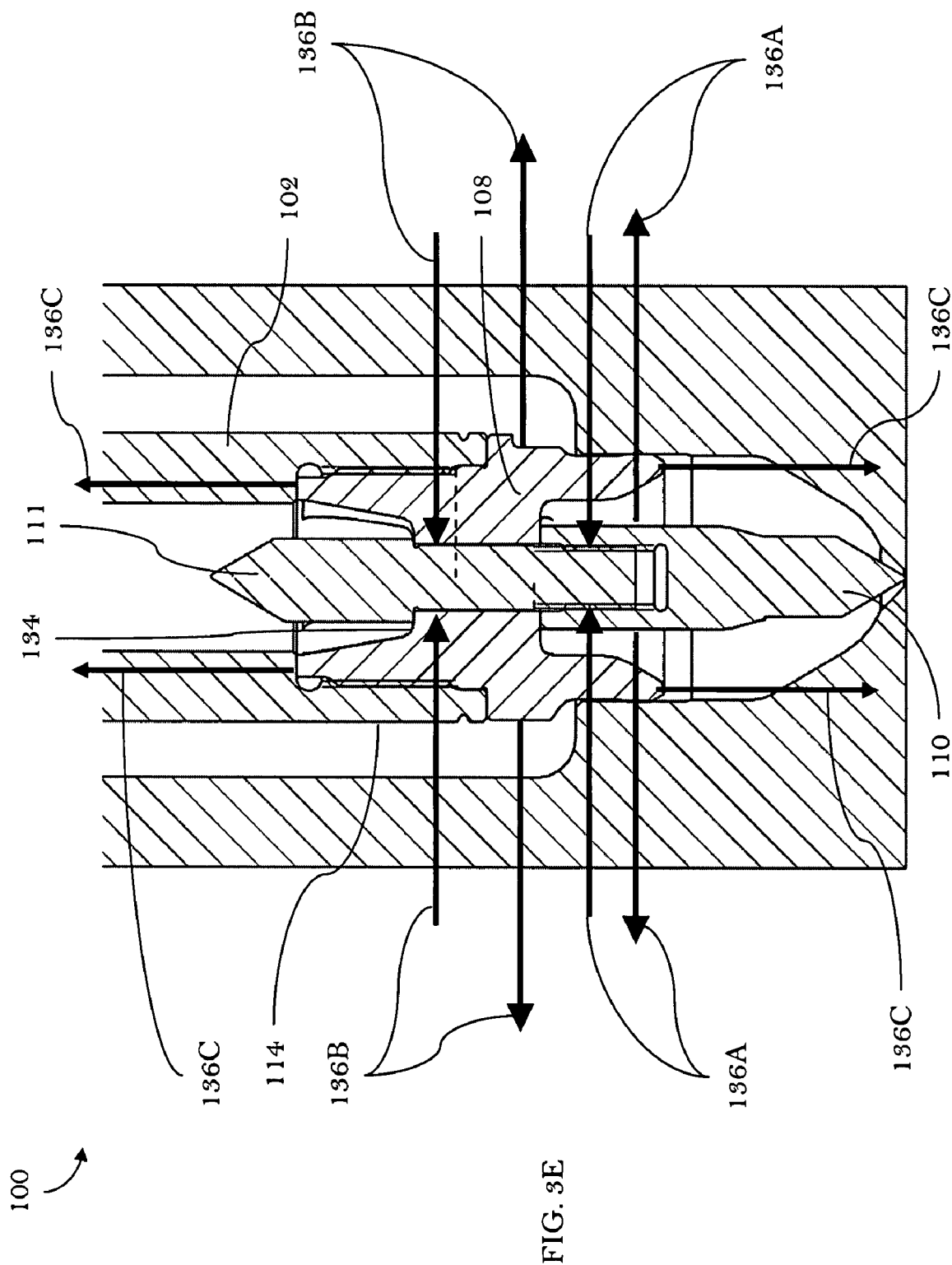
FIG. 3E depicts a cross-sectional view of the system 100 according to a fourth non-limiting embodiment.

FIG. 3E depicts the cross-sectional view of the system 100 according to the fourth non-limiting embodiment, in which a thermal-expansion coefficient associated with the retainer 111 is lower than: (i) a thermal-expansion coefficient associated with the sieve 108, and (ii) a thermal-expansion coefficient associated with the nozzle tip 110. In this arrangement, the nozzle tip 110 and the retainer 111 may be preloaded, so that for the case when a segment of the sieve 108 (located between the forward face 130 and the aft face 134) is heated, the sieve 108 will expand axially (along the longitudinal axis that extends through the nozzle housing 102) more than the retainer 111 will expand axially. In this arrangement (once the system 100 is heated), the sieve 108 pushes against the nozzle tip 110 but the retainer 111 does not yield too much (due to the arrangement of the relative thermal-expansion coefficients between the retainer 111, the nozzle tip 110 and the sieve 108), so that the nozzle tip 110 becomes further secured or further securably locked with the sieve 108.

Once heating is applied to the system 100, the system 100 experiences radial expansion forces 136A, radial expansion forces 136B, and axial expansion forces 136C. The radial expansion forces 136A and the radial expansion forces 136B are arranged such that: (i) the sieve 108 will expand in the radial direction so as to further grasp or choke the retainer 111 that is received in the sieve 108, and (ii) the nozzle tip 110 will expand in the radial direction so as to further grasp or choke the retainer 111 that is received in the nozzle tip 110. The axial expansion forces 136C are arranged such that the sieve 108 will expand axially (while the retainer 111 does not expand axially too much relative to the sieve 108 and the nozzle tip 110) so that the sieve 108 pushes against the nozzle tip 110 so that secure holding (or locking) of the nozzle tip 110 relative to the retainer 111 may be further improved. The radial expansion forces 136A and 136B do not (by themselves) lock the nozzle tip 110 in a fixed position. The axial expansion forces 136C help to lock the nozzle tip 110 in a fixed position.

The description of the non-limiting embodiments provides non-limiting examples of the present invention; these non-limiting examples do not limit the scope of the claims of the present invention. The non-limiting embodiments described are within the scope of the claims of the present invention. The non-limiting embodiments described above may be: (i) adapted, modified and/or enhanced, as may be expected by persons skilled in the art, for specific conditions and/or functions, without departing from the scope of the claims herein, and/or (ii) further extended to a variety of other applications without departing from the scope of the claims herein. It is to be understood that the non-limiting embodiments illustrate the aspects of the present invention. Reference herein to details and description of the non-limiting embodiments is not intended to limit the scope of the claims of the present invention. Other non-limiting embodiments, which may not have been described above, may be within the scope of the appended claims. It is understood that: (i) the scope of the present invention is limited by the claims, (ii) the claims themselves recite those features regarded as essential to the present invention, and (ii) preferable embodiments of the present invention are the subject of dependent claims. Therefore, what is to be protected by way of letters patent are limited only by the scope of the following claims:

What is claimed is:

1. A hot-runner nozzle system, comprising:
a nozzle housing being configured to convey a molten molding material;
a sieve being coupled with the nozzle housing;
a separate nozzle tip being securely coupled relative to the sieve; and
a retainer securely extending through the sieve, the retainer connecting the nozzle tip to the sieve.

2. The hot-runner nozzle system of claim 1, wherein:
the nozzle tip is interactable with a mold cavity being defined by a mold;
the nozzle housing is connectable with a melt passageway associated with a manifold of a hot runner, the nozzle housing includes:
an entrance being connectable with the melt passageway associated with the manifold of the hot runner, and
an exit; and
the sieve couples with the exit of the nozzle housing.

3. The hot-runner nozzle system of claim 1, wherein:
the nozzle tip, includes:
a copper alloy being mated to a forward face of a center portion of the sieve.

4. The hot-runner nozzle system of claim 1, wherein:
the nozzle tip includes:
a bore being configured to permit the nozzle tip to be securely joined with the retainer, the retainer being configured to be received in the bore.

5. The hot-runner nozzle system of claim 1, wherein:
the sieve is configured to:
accommodate a device, and
route a wire to the device, the wire being connectable to the device.

6. The hot-runner nozzle system of claim 1, wherein:
the nozzle tip is configured to:
accommodate a device, and
route a wire to the device, the wire being connectable to the device.

7. The hot-runner nozzle system of claim 1, wherein:
the sieve is threadably joined with the nozzle housing so that a primary sealing interface and a secondary sealing interface may be established between the sieve and an exit associated with the nozzle housing.

8. The hot-runner nozzle system of claim 1, wherein:
the sieve includes:
a gate-contact portion being contactable against a mold insert, the mold insert leading to a mold cavity being defined by a mold so that a gate-sealing surface may be established between:
the gate-contact portion, and
the mold insert leading to the mold cavity.

9. The hot-runner nozzle system of claim 1, wherein:
the sieve includes:
a plurality of passages being configured to convey the molten molding material through the sieve.

10. The hot-runner nozzle system of claim 1, wherein:
the sieve is configured to accommodate:
a device; and
a wire being routed to the device, the wire being connected with the device.

11. The hot-runner nozzle system of claim 1, wherein:
the sieve is configured to accommodate:
a valve stem being movable relative to the sieve.

12. The hot-runner nozzle system of claim 1, wherein:
the nozzle housing, has:
an entrance being connectable with a melt passageway associated with a manifold of a hot runner, and an exit;
the sieve is securely coupling with the exit of the nozzle housing, the sieve includes:
the retainer securely extending from the sieve;
the nozzle tip is securely coupled relative to the sieve, the nozzle tip securely connects with the retainer,
a thermal-expansion coefficient being associated with the retainer is lower than:
   (i) a thermal-expansion coefficient being associated with the sieve, and
   (ii) a thermal-expansion coefficient being associated with the nozzle tip,
so that when the retainer, the sieve and the nozzle tip are heated, the nozzle tip is prevented from becoming disconnected relative to the sieve.

13. The hot-runner nozzle system of claim 1, wherein:
the retainer is configured to:
   accommodate a device, and
   route a wire to the device, the wire being connectable to the device.

14. The hot-runner nozzle system of claim 1, wherein:
the sieve, includes:
   a center portion , having:
     an aft face; and
the retainer is mated with the aft face associated with the center portion of the sieve.

15. The hot-runner nozzle system of claim 1, wherein:
a thermal-expansion coefficient associated with the retainer is lower than:
   a thermal-expansion coefficient associated with the sieve, and
   a thermal-expansion coefficient associated with the nozzle tip.

16. The hot-runner nozzle system of claim 1, wherein:
arrangement of the nozzle housing, the sieve, the nozzle tip and the retainer are such that crack susceptible high stress concentration features that are made with copper alloy are removed from a melt stream.

17. The hot-runner nozzle system of claim 1, wherein:
arrangement of the nozzle housing, the sieve, the nozzle tip and the retainer allows exertion of hoop stress and fatigue stress only on the nozzle housing and the sieve.

18. The hot-runner nozzle system of claim 1, wherein:
the nozzle housing, the sieve, the nozzle tip and the retainer collectively define a channel, the channel is routed such that routing and attachment of a thermocouple may be accommodated proximate to the nozzle tip.

19. The hot-runner nozzle system of claim 1, wherein:
the sieve includes:
   a center portion located along a longitudinal axis of the sieve, the center portion includes:
     an opening being configured to accommodate a device.

20. The hot-runner nozzle system of claim 1, wherein:
the sieve includes:
   a center portion having a passageway,
   a forward face configured to seat the nozzle tip, and
   an aft face configured to seat the retainer.

21. The hot-runner nozzle system of claim 1, wherein:
the sieve is configured to accommodate a wire, so that the wire may be coupled with a thermocouple located proximate with the nozzle tip.

22. The hot-runner nozzle system of claim 1, wherein:
a thermal-expansion coefficient associated with the retainer is less than a thermal-expansion coefficient associated with the sieve so that the nozzle tip and the retainer may be preloaded, and when heated a segment between a forward face and an aft face of the sieve will expand along a longitudinal axis of the nozzle housing more than the retainer will expand.

23. A hot runner having the hot-runner nozzle system of claim 1.

24. An injection-molding system including a hot runner, the hot runner having the hot-runner nozzle system of claim 1.

* * * * *